United States Patent
Niermann et al.

(10) Patent No.: US 6,736,721 B2
(45) Date of Patent: May 18, 2004

(54) STALK AND CHAFF DISTRIBUTION ARRANGEMENT

(75) Inventors: Martin Niermann, Harsewinkel (DE); Jürgen Nollmann, Versmold (DE); Jörn Brinkmann, Harsewinkel (DE); Dieter Amsbeck, Harsewinkel (DE)

(73) Assignee: Claas Selbstfahrende Erntemaschinen GmbH, Harsewinkel (DE)

( * ) Notice: Subject to any disclaimer, the term of this patent is extended or adjusted under 35 U.S.C. 154(b) by 6 days.

(21) Appl. No.: 10/197,138

(22) Filed: Jul. 17, 2002

(65) Prior Publication Data

US 2003/0017861 A1 Jan. 23, 2003

(30) Foreign Application Priority Data

Jul. 17, 2001 (DE) .......................................... 101 33 965

(51) Int. Cl.$^7$ ................................................ A01F 12/40
(52) U.S. Cl. ...................................... 460/112; 460/901
(58) Field of Search ................................. 460/111, 112, 460/901

(56) References Cited

U.S. PATENT DOCUMENTS 5,021,030 A * 6/1991 Halford et al. ............. 460/111
5,797,793 A * 8/1998 Matousek et al. .......... 460/111
6,602,131 B2 * 8/2003 Wolters ..................... 460/111
2002/0142814 A1 * 10/2002 Niermann ..................... 460/79

FOREIGN PATENT DOCUMENTS

| DE | 199 08 111 C1 | | 7/2000 |
| EP | 0212337 A1 | * | 7/1986 |
| WO | 99/33333 | * | 7/1999 |

* cited by examiner

Primary Examiner—Robert E. Pezzuto
Assistant Examiner—Meredith Petravick
(74) Attorney, Agent, or Firm—Hush & Eppenberger, LLC; Robert C. Muir; Robert C. Haldiman

(57) ABSTRACT

A stalk and chaff distribution arrangement in an agricultural harvesting machine having a chopping device arranged in a discharge region of the machine includes first and second blowers arranged adjacent to each other in the discharge region and each blower having a rotary shaft, a crop inlet opening, and a crop outlet opening; a crop dividing plate associated with the first and second blowers, the crop dividing plate having an apex and first and second diverging arms, said apex arranged in the direction opposite a crop flow from the chopping device to the blowers; and a first adjustable partial casing moveably associated the first blower and adjoining the first diverging arm, said first adjustable partial casing arranged circumferentially with the first blower; whereby a direction of the crop flow from the crop outlet of the first blower is changed when the first adjustable partial casing is moved.

23 Claims, 6 Drawing Sheets

STALK AND CHAFF DISTRIBUTION ARRANGEMENT

TECHNICAL FIELD OF THE INVENTION

The present invention relates generally to agricultural machinery and, more particularly, to an arrangement in an agricultural harvesting machine for uniform distribution of chopped stalks, chaff and the like.

DESCRIPTION OF THE RELATED ART

German Patent No. 19908111 C1 discloses a combine harvester in which a crop stream discharged from a chopper device and consisting of material other than grain (e.g. a stalks/chaff mixture) is radially delivered directly to a subsequent blower device without being in any way deflected and thus retarded. The device consists of at least two blowers which are equipped with partial casings, which aid distribution of the crop stream. These partial casings fulfil their purpose on account of their fixed setting, but only under constant predicted harvesting conditions. Due to the radially extending, wedge-shaped flattening of the casing, controllable discharge of the crop mass is possible only to a limited extent. Further, due to the space-related arrangement of the blowers inclined toward the ground, the distance between crop discharge and the ground is different, so that the crop layer deposited on the ground varies greatly in thickness.

The present invention is directed to overcoming one or more of the problems set forth above.

SUMMARY OF THE INVENTION

An aspect of the present invention is to provide a variable distribution arrangement that ensures wide and even distribution of chopped stalks and/or chaff.

Another aspect of the present invention is to provide an arrangement that enhances uniform deposition of chopped stalks and/or chaff from blowers in an agricultural harvesting machine onto the ground.

Yet another aspect of the present invention is to provide an arrangement that enhances the uniform deposition of crop material from the blowers without interfering with the crop stream entering the blowers.

In accordance with the above aspect of the invention, there is provided a chopped stalks and chaff distribution arrangement in an agricultural harvesting machine having a chopping device arranged in a discharge region of the machine that includes first and second blowers arranged adjacent to each other in the discharge region and each blower having a rotary shaft, a crop inlet opening, and a crop outlet opening; a crop dividing plate associated with the first and second blowers, the crop dividing plate having an apex and first and second diverging arms, said apex arranged in the direction opposite a crop flow from the chopping device to the blowers; and a first adjustable partial casing moveably associated the first blower and adjoining the first diverging arm, said first adjustable partial casing arranged circumferentially with the first blower; whereby a direction of the crop flow from the crop outlet of the first blower is changed when the first adjustable partial casing is moved.

These aspects are merely illustrative of the innumerable aspects associated with the present invention and should not be deemed as limiting in any manner. These and other aspects, features and advantages of the present invention will become apparent from the following detailed description when taken in conjunction with the drawings.

BRIEF DESCRIPTION OF THE DRAWINGS

Reference is now made more particularly to the drawings which illustrate the best presently known mode of carrying out the invention and wherein similar reference characters indicate the same parts throughout the views.

DETAILED DESCRIPTION

Figure 1:
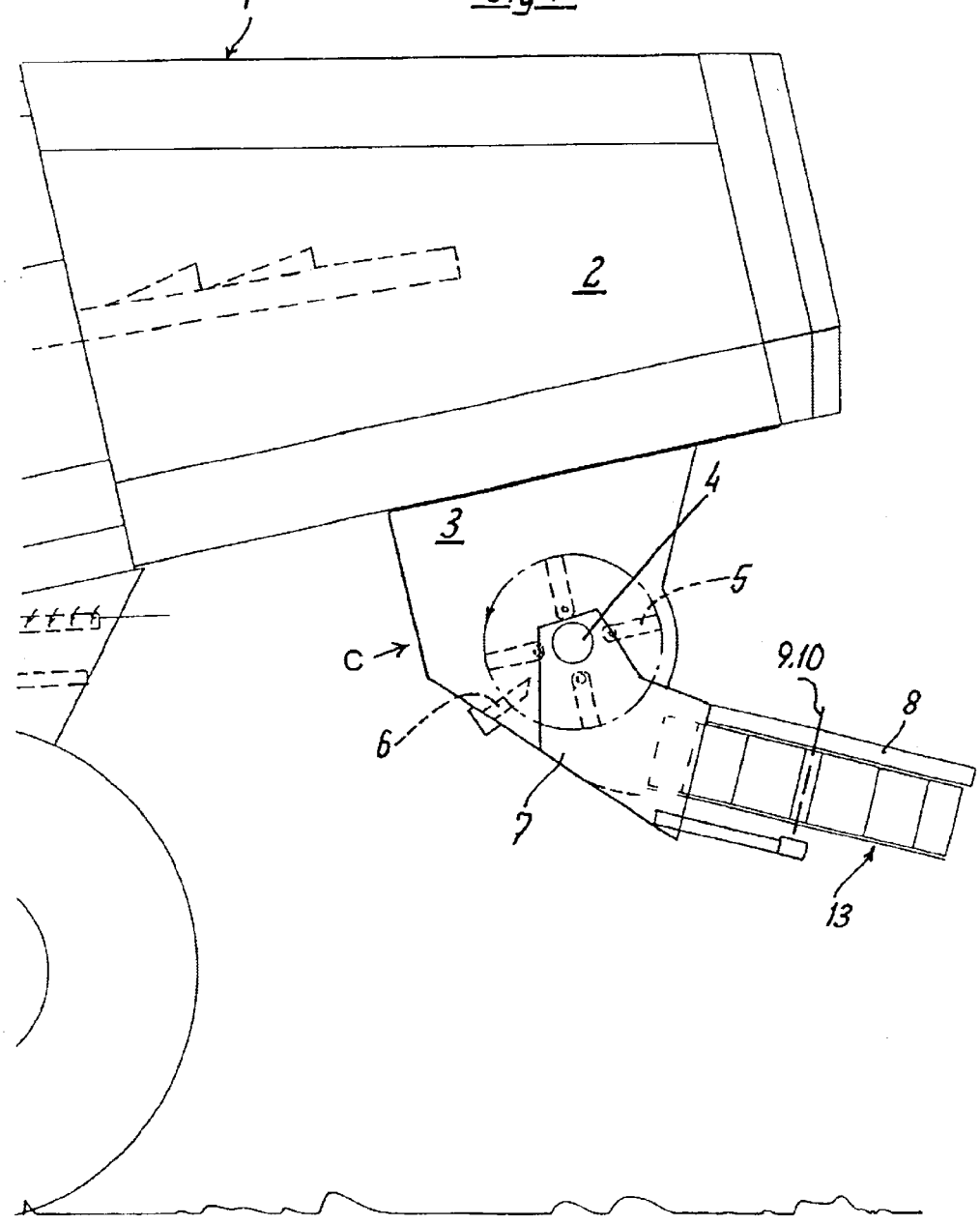
FIG. 1 is a partial schematic view of a discharge region of an agricultural harvesting machine incorporating a chopped stalks and chaff distribution arrangement embodying the present invention.

FIG. 1 illustrates a rear portion 1 of a combine harvester, including a rear hood 2 and an adjoined chopper housing 3 for a chopping device C. A shaft 4 is drivably mounted in the chopper housing 3 and fitted with pivotable chopper blades 5. These chopper blades 5 mesh with a single blade 6 fixed to the housing. A support portion 7 of a subsequent blower device 13 is mounted on the chopper shaft 4. Rigidly connected to the support portion 7 is a rearwardly projecting cover portion 8 in which rotary shafts 9 and 10 are drivably mounted. These rotary shafts 9 and 10 are fitted with flexible vanes 11 (shown in FIG. 2) which are covered at the bottom by a co-rotating disc 12. As shown, there are advantageously two blowers 13.

Figure 2:
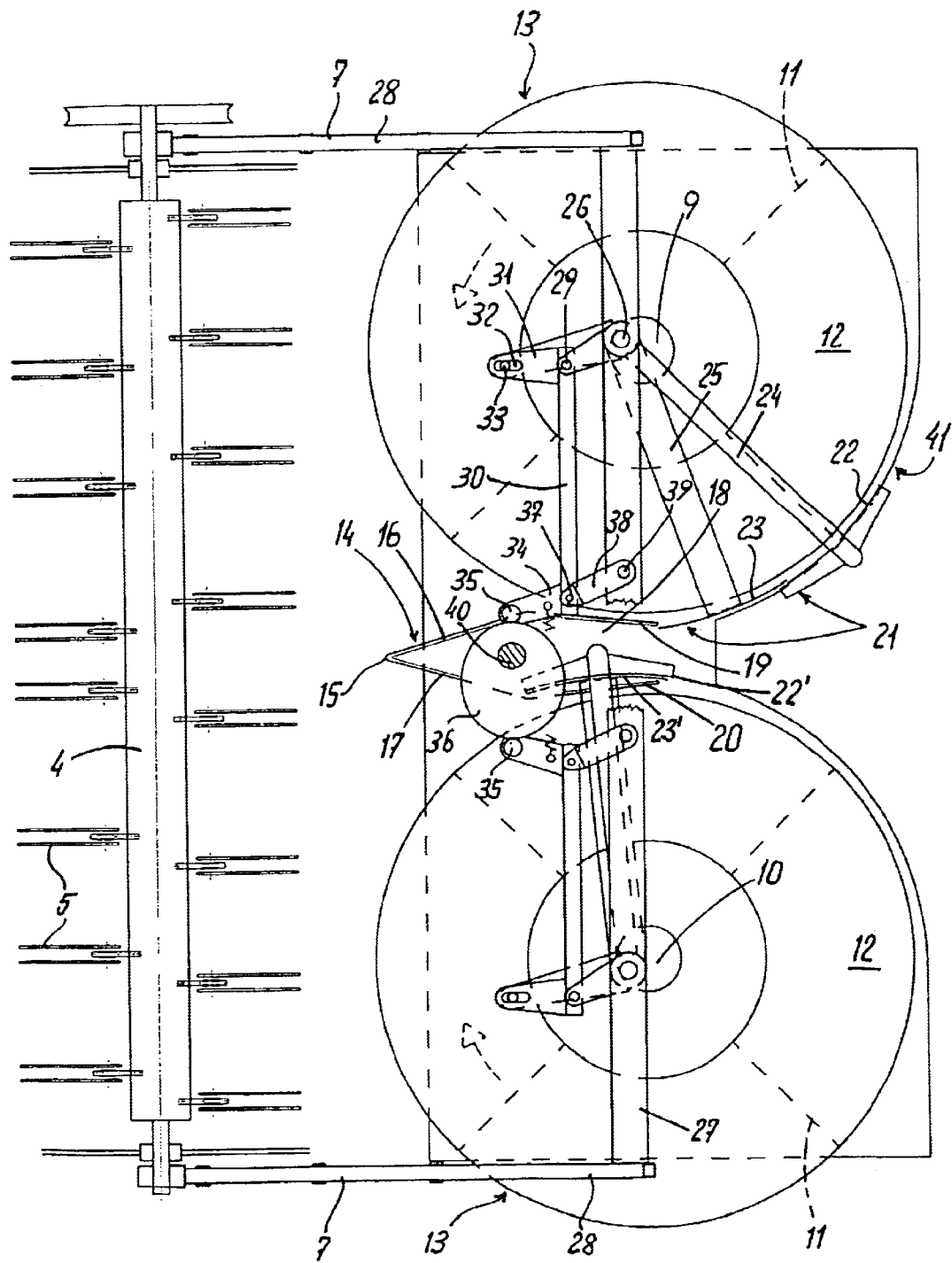
FIG. 2 is a bottom view of the distribution arrangement shown in FIG. 1.
Figure 3:
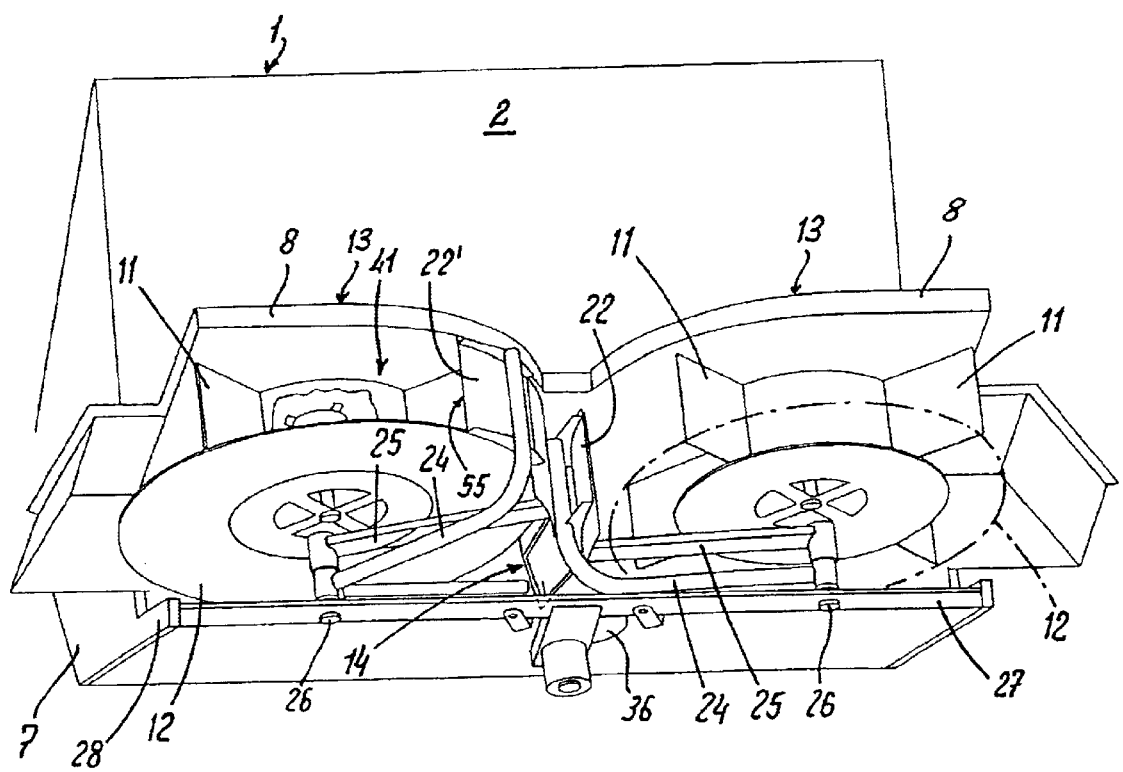
FIG. 3 is a perspective view thereof.

Associated with the blowers 13, is a crop dividing plate 14 whose apex 15 is directed toward the crop stream being ejected from the chopping device C. Diverging arms 16, 17 of the crop dividing plate 14 and partial casings 19, 20 for the blowers 13 enclose a space 18. As the upper half of FIG. 2 shows, adjoining the partial casing 19 is a further partial casing 21 which consists of two wall portions 22, 23. The two wall portions 22, 23 are attached to the distal ends of the longer arms of angle levers 24 and 25, respectively. Angle levers 24, 25 are mounted on a journal 26. The latter is rigidly connected to a crossbar 27 which is attached by lateral longitudinal members 28 to the frame portion 7. The short arm of the angle lever 24 is pivotably connected by a mounting 29 to a connecting rod 30. The mounting 29 is conveniently in the form of a bolt. Adjacent the mounting 29 is a bracket 31 fixed to the connecting rod 30 as by welding. The bracket 31 has an oblong hole 32 at its distal end. A bolt 33 extends into this oblong hole 32 and bolt 33 is rigidly connected to the shorter arm of the angle lever 25. At the end of the connecting rod 30 opposite the mounting 29 is welded a further bracket 34. Bracket 34 carries a roller 35 at its distal end. This roller 35 continuously abuts a drivable disc 36 which is eccentrically mounted on a rotary shaft 40. In the region of the bracket 34, one end of a control arm 38 is mounted on the connecting rod 30 via a fastener conveniently in the form of a bolt 37. The opposite end of the control arm 38 has a further bolt 39 for mounting on the crossbar 27.

Figure 4:
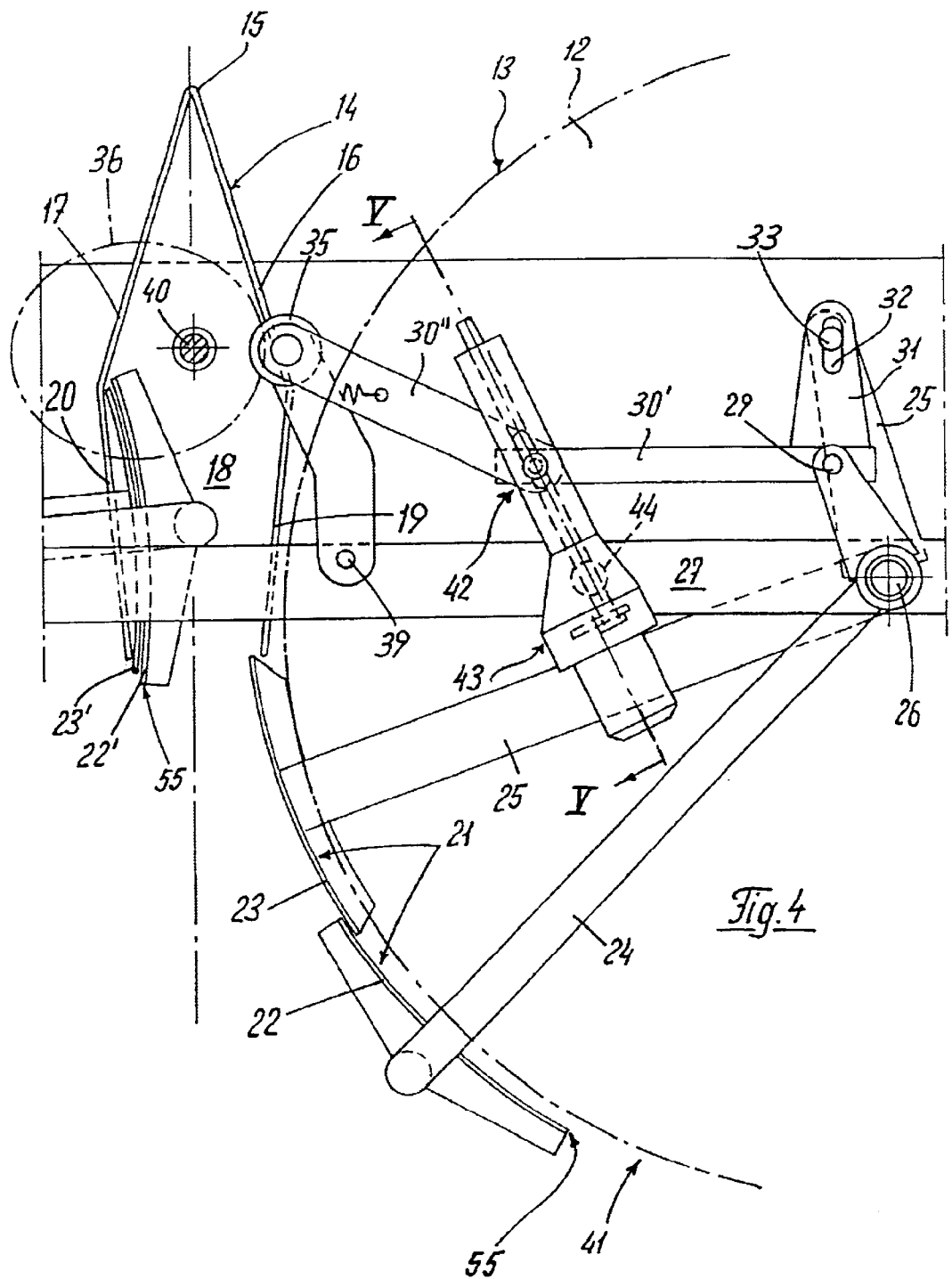
FIG. 4 is a detail view of an adjusting mechanism of a distribution arrangement according to another embodiment.

In the position shown in FIG. 2 or 4, the roller 35 is at the minimum distance from the rotary shaft 40 of the eccentrically mounted disc 36. If the latter is now rotated clockwise, the two wall portions 22, 23 pivot about the axis 26 first at low speed and then at increasing speed into the space 18. At the same time the wall portions 22', 23' shown in the lower half of FIG. 2 pivot first at high speed and then at decreasing speed out of the space 18. The kinematic arrangement here is selected so that during displacement of the connecting rod 30 the wall portions 22, 23 move at different speeds, this being in a ratio of 1:2. This means that the wall portion 23 is pivoted at only half the speed of the wall portion 22. This causes them first to form a relatively large circumferential cover for the outlet opening 41 in their fully extended position shown in the upper half of FIG. 2. But they fully clear this opening because during their movement of retraction into the space 18 they slide one over the other telescopically more and more until they have fully entered the space 18. See, for example, the position of wall portions 22', 23' shown in the lower half of FIG. 2. The blower 13 shown in the lower half of FIG. 2 is constructed identically, but in a mirror image, as its counterpart shown in the upper half of FIG. 2. Accordingly, further description is deemed unnecessary.

Figure 5:
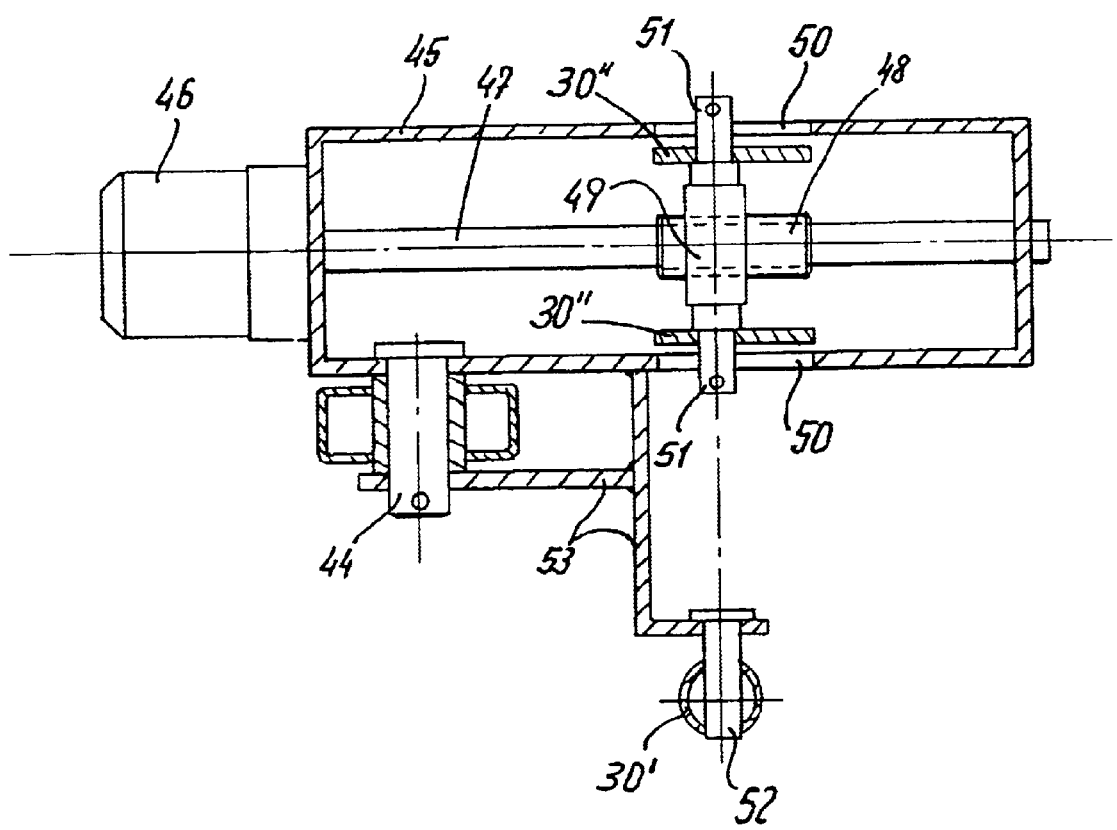
FIG. 5 is a sectional view taken generally along line V—V of FIG. 4.

FIG. 4 shows one way in which the normal position of the two wall portions 22, 23 can be adjusted. As this adjustment facility can be used in the same way for the wall portions 22', 23', it will be described only once. Unlike the embodiment in FIG. 2, the connecting rod 30 in this embodiment is divided into two portions 30' and 30". These two portions 30', 30" are pivotally connected at a bend point 42 which is displaceable by means of a spindle mechanism 43. In this arrangement the pivot angle of the movable wall portions 22, 22', 23, 23' is adjustable. The spindle mechanism 43 as a whole is pivotably mounted on a shaft 44 which is attached to the crossbar 27. Details can be seen in FIG. 5 which shows that attached to the shaft 44 is a housing 45 on which has been flange-mounted a gear motor 46. A spindle 47 is driven by the gear motor 46 and has a threaded portion 48. Driven by the threaded portion 48 is a spindle nut 49 which has two journals 51 projecting from the housing 45 through slots 50. On these journals 51 is mounted the connecting rod portion 30" which splays in a fork shape. The connecting rod portion 30' is pivotably connected to a mounting 53 by a fastener such as a bolt 52. The mounting 53 is conveniently designed as part of the housing 45.

Figure 6:
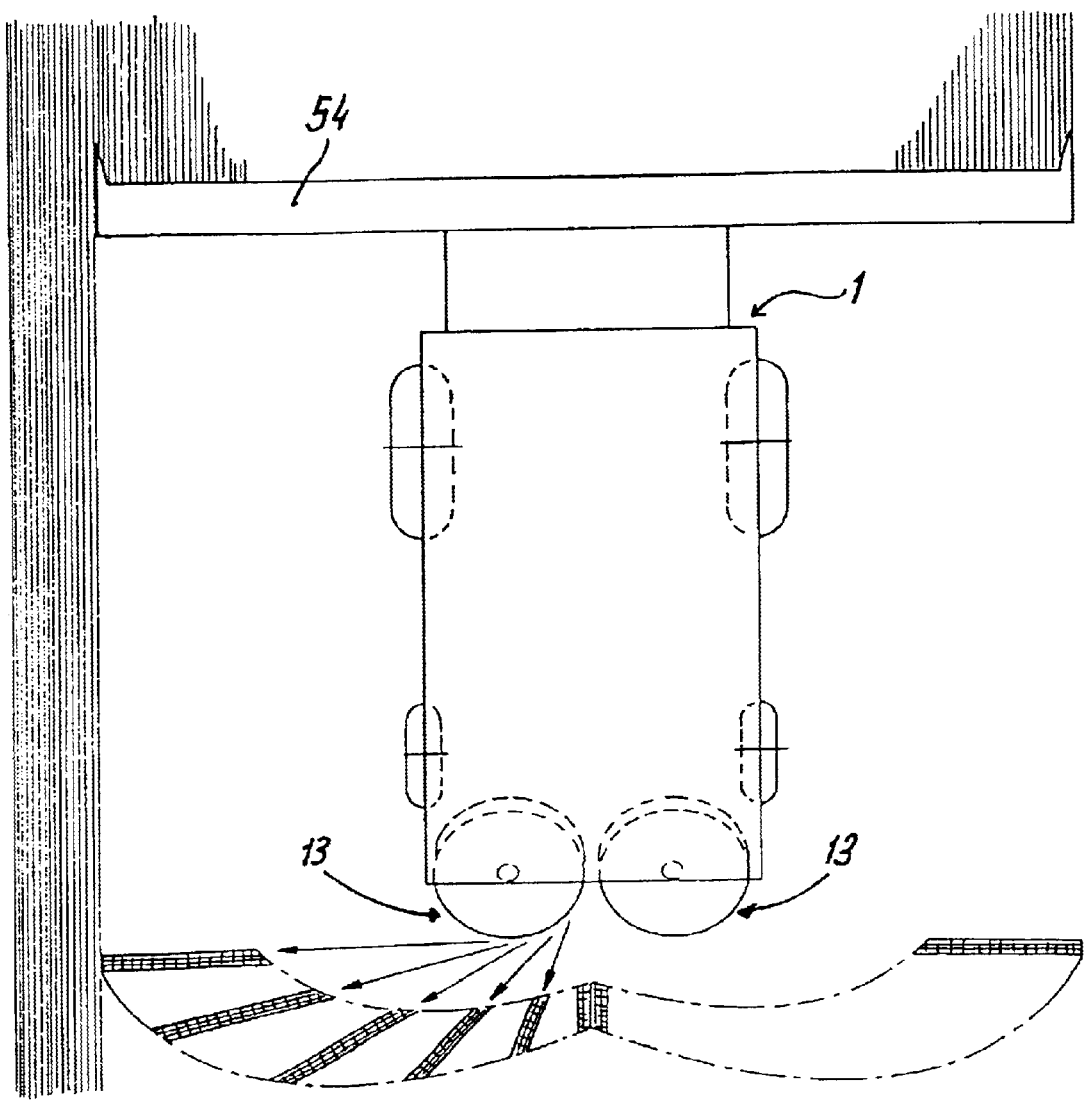
FIG. 6 is a schematic view of a crop distribution pattern from an agricultural harvesting machine incorporating the distribution arrangement.

FIG. 6 shows the desired scatter pattern of the material other than grain (MOG) which is spread by the two blowers 13. Advantageously a generally uniform distribution is achieved according to the width of the cutterbar 54. Because the rotary shaft 10 of the blowers 13 assumes a position at an angle to the vertical, the path of the crop leaving the blowers 13 to the ground becomes shorter or longer as a function of the instantaneous position of the wall portion 22, 22' having the greater pivot angle. If there were a constant speed of rotation of the wall portions 22, 22', 23, 23', the MOG leaving the blowers 13 would be distributed unevenly over the ground. To achieve more even distribution over the ground, at least the outer wall portions 22, 22' which form a movable break-away edge 55 (FIG. 4) pivot about the respective rotary shaft 26 at a circumferential speed varying as a function of the instantaneous position of the break-away edge 55. This position-dependent speed control is accomplished, as described above, by means of the eccentrically mounted elliptical cam disc 36. Because only one cam disc 36 is provided for driving the pivotable wall portions 22, 23; 22', 23' of each blower 13, the wall portions 22, 23 or 22', 23' reach the inner and outer dead center positions shown in FIG. 2 alternately, wherein the circumferential speed of the pivotable wall portions 22, 23; 22', 23' decreases when pivoting from the inner to the outer dead center position and conversely increases when pivoting from the outer to the inner dead center position. While two wall portions (22, 23 or 22', 23') have been described, it is perceived that the two portions may be integrated or that the outer wall portion 22 or 22' alone may be pivoted as suggested above.

While the terms "stalk and chaff" and "crop" are used in the claims, it is intended that these be synonymous with the term "material other than grain." Other objects, features and advantages of the present invention will be apparent to those skilled in the art. While preferred embodiments of the present invention have been illustrated and described, this has been by way of illustration and the invention should not be limited except as required by the scope of the appended claims and their equivalents.

What is claimed is:

1. A stalk and chaff distribution arrangement in an agricultural harvesting machine having a chopping device arranged in a discharge region of the machine, the arrangement including:

first and second blowers located adjacent each other in the discharge region and each blower having a rotary shaft, a crop inlet opening, and a crop outlet opening;

a crop dividing plate associated with the crop inlet openings of the first and second blowers, the crop dividing plate having an apex and first and second diverging arms, said apex arranged in the direction opposite a crop flow from the chopping device to the blowers;

an adjustable partial casing moveably associated with each blower and in close cooperation with one of the diverging arms when said partial casing is in a retracted position, each adjustable partial casing arranged circumferentially with the respective blower, each partial casing having a leading edge located in the direction of the axis of rotation of the first blower, and a kinematic apparatus operatively engaged with the partial casings such that a direction of the crop flow from the crop outlets of the blowers is thereby changed.

2. A stalk and chaff distribution arrangement in an agricultural harvesting machine according to claim 1, wherein the kinematic apparatus is operative to pivot the leading edge of the first partial casing from the retracted neutral position to a filly extended position at a first variable speed which decreases as a break-away edge of said partial casing approaches the fully extended position and to pivot the leading edge from the fully extended position to the retracted neutral position at a second variable speed that increases as the leading edge approaches the retracted neutral position.

3. A stalk and chaff distribution arrangement in an agricultural harvesting machine having a chopping device arranged in a discharge region of the machine, the arrangement including:

first and second blowers located adjacent each other in the discharge region and each blower having a rotary shaft, a crop inlet opening, and a crop outlet opening;

a crop dividing plate associated with the crop inlet openings of the first and second blowers, the crop dividing plate having an apex and first and second diverging arms, said apex arranged in the direction opposite a crop flow from the chopping device to the blowers;

an adjustable partial casing moveably associated with each blower and in close cooperation with one of the diverging arms, each adjustable partial casing arranged circumferentially with the respective blower; and a kinematic apparatus operatively engaged with the partial casings such that a direction of the crop flow from the crop outlets of the blowers is changed by moving the partial casings cyclically in and out of a space between the first and second diverging arms.

4. A stalk and chaff distribution arrangement in an agricultural harvesting machine having a chopping device arranged in a discharge region of the machine, the arrangement including:

first and second blowers located adjacent each other in the discharge region and each blower having a rotary shaft, a crop inlet opening, and a crop outlet opening;

a crop dividing plate associated with the crop inlet openings of the first and second blowers, the crop dividing plate having an apex and first and second diverging arms, said apex arranged in the direction opposite a crop flow from the chopping device to the blowers;

an adjustable partial casing moveably associated with each blower and in close cooperation with one of the diverging arms, each adjustable partial casing arranged circumferentially with the respective blower each partial casing including first and second wail portions; and a kinematic apparatus operatively engaged with the partial casings such that a direction of the crop flow from the crop outlets of the blowers is thereby changed.

5. A stalk and chaff distribution arrangement in an agricultural harvesting machine according to claim 4, wherein the first and second wall portions of the adjustable partial casings are pivoted telescopically over one another, thereby at least partially overlapping one another in at least one position.

6. A stalk and chaff distribution arrangement in an agricultural harvesting machine according to claim 5, wherein the first and second wall portions of the adjustable partial casings overlap one another in a space between the first and second diverging arms.

7. A stalk and chaff distribution arrangement in an agricultural harvesting machine according to claim 4, further including a piston and cylinder unit and wherein the first and second wall portions are pivoted by the piston and cylinder unit.

8. A stalk and chaff distribution arrangement in an agricultural harvesting machine according to claim 4, further including a pivot shaft arranged parallel to the rotary shaft of each blower, and means for pivotally mounting the first and second wall portions of the respective partial casing on the pivot shaft.

9. A stalk and chaff distribution arrangement in an agricultural harvesting machine according to claim 8, further including a crossbar running transversely to a direction of travel of the agricultural harvesting machine and wherein the pivot shaft is mounted on the cross bar.

10. A stalk and chaff distribution arrangement in an agricultural harvesting machine according to claim 9, further including:

a first angle lever operatively connected with the first wall portion of each adjustable partial casing and having a longer arm and a shorter arm;

a second angle lever operatively connected with the second wall portion of each adjustable partial casing and having a longer arm and a shorter arm; and a common pivot shaft upon which the first and second angle levers are mounted.

11. A stalk and chaff distribution arrangement in an agricultural harvesting machine according to claim 10, further including a connecting rod having first and second ends and wherein the shorter arm of the first angle lever and the shorter arm of the second angle lever are connected with the first end of the connecting rod.

12. A stalk and chaff distribution arrangement in an agricultural harvesting machine according to claim 11, further including:

a cam disc operatively associated with the first adjustable casing, said cam disc effecting a position-dependent speed control of the first adjustable casing; and a roller associated with the second end of the connecting rod for abutting the cam disc.

13. A stalk and chaff distribution arrangement in an agricultural harvesting machine according to claim 11, further including a control arm connected with the second end of the connecting rod and the crossbar.

14. A stalk and chaff distribution arrangement in an agricultural harvesting machine according to claim 11, wherein the connecting rod includes first and second articulated sections, and means for displacing the articulated sections to vary their angular relationship.

15. A stalk and chaff distribution arrangement in an agricultural harvesting machine according to claim 14, wherein the means for displacing the articulated sections includes a spindle mechanism operatively associated therewith.

16. A stalk and chaff distribution arrangement in an agricultural harvesting machine according to claim 15, further including:

a housing associated with the spindle mechanism and the first and second sections of the connecting rod; and a second shaft associated with the crossbar, wherein the housing is pivotable about the second shaft.

17. A stalk and chaff distribution arrangement in an agricultural harvesting machine according to claim 4, wherein the first and second wall portions are pivoted at different speeds.

18. A stalk and chaff distribution arrangement in an agricultural harvesting machine according to claim 17, wherein the first and second wall portions are pivoted at different speeds in a ratio of 1:2.

19. A stalk and chaff distribution arrangement in an agricultural harvesting machine having a chopping device arranged in a discharge region of the machine, the arrangement including:

a rotary blower arranged in the discharge region, whereby a crop flow from the chopping device goes to the blower, said blower arranged at an angle from the vertical;

an adjustable partial casing moveably associated with the rotary blower and arranged circumferentially to the blower; and means for moving said adjustable partial casing with a circumferential speed that varies as a function of the position of the adjustable partial casing.

20. A stalk and chaff distribution arrangement in an agricultural harvesting machine according to claim 19, wherein the means for moving said adjustable partial casing includes a cam operatively associated with the adjustable partial casing, said cam effecting the position-dependent circumferential speed control of the adjustable partial casing.

21. A stalk and chaff distribution arrangement in an agricultural harvesting machine according to claim 20, wherein the cam is eccentrically mounted.

22. A stalk and chaff distribution arrangement in an agricultural harvesting machine according to claim 20, wherein the cam is elliptically shaped.

23. A combine harvester having a transfer device arranged in a discharge region, from where a stalk and chaff mixture is delivered radially to a pair of adjacent blowers each having a crop inlet opening, a crop dividing plate having diverging arms and an apex facing in a direction opposite the direction of mixture delivery for the purpose of dividing the crop into two partial streams, the diverging arms of the crop dividing plate each forming a partial casing for one of the blowers, each blower having an adjustable partial casing, each partial casing having a leading edge forming an edge of the outlet opening of the blowers, and means for cyclically moving the adjustable partial casings into and out of a space between the two diverging arms of the crop dividing plate for the purpose of changing the direction of the mixture being discharged from the blowers.

* * * * *

UNITED STATES PATENT AND TRADEMARK OFFICE
CERTIFICATE OF CORRECTION

PATENT NO. : 6,736,721 B2  
APPLICATION NO. : 10/197138  
DATED : May 18, 2004  
INVENTOR(S) : Niermann et al.

Page 1 of 1

It is certified that error appears in the above-identified patent and that said Letters Patent is hereby corrected as shown below:

Title Page, Item (74) under Attorney, Agent or Firm, please change the spelling of "Hush" to the correct spelling of --Husch--

Signed and Sealed this

Twenty-second Day of May, 2007

JON W. DUDAS  
*Director of the United States Patent and Trademark Office*